(12) United States Patent
Moore (10) Patent No.: US 10,780,304 B1
(45) Date of Patent: Sep. 22, 2020

(54) METHODS AND APPARATUS FOR CONVERTING MANUAL TO OSCILLATING FLUID MONITORS

(71) Applicant: ELKHART BRASS MANUFACTURING COMPANY, INC., Elkhart, IN (US)

(72) Inventor: Michael L Moore, Houston, TX (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 0 days.

(21) Appl. No.: 15/995,063

(22) Filed: May 31, 2018

Related U.S. Application Data (60) Provisional application No. 62/513,058, filed on May 31, 2017.

(51) Int. Cl.
| | |
|---|---|
| *A62C 31/28* | (2006.01) |
| *F03B 1/00* | (2006.01) |
| *A62C 31/02* | (2006.01) |
| *F03B 15/20* | (2006.01) |

(52) U.S. Cl.
CPC .............. *A62C 31/28* (2013.01); *A62C 31/02* (2013.01); *F03B 1/00* (2013.01); *F03B 15/20* (2013.01); *F05B 2260/50* (2013.01)

(58) Field of Classification Search
CPC . A62C 31/28; A62C 31/02; F03B 1/00; F03B 15/20; F05B 2260/50

USPC ........ 239/69, 237, 240, 241, 242, 263, 160, 239/164, 166, 587.1–587.5; 169/16, 18, 169/24, 25, 51, 52; 285/147.1, 181
See application file for complete search history.

(56) References Cited

U.S. PATENT DOCUMENTS

| | | | | |
|---|---|---|---|---|
| 610,926 | A * | 9/1898 | Suetterle | B05B 3/0422 239/240 |
| 795,176 | A * | 7/1905 | Stenberg | A62C 31/24 169/25 |
| 6,305,620 | B1 * | 10/2001 | Marchese | A62C 31/24 239/587.1 |
| 7,137,578 | B2 * | 11/2006 | Steingass | A62C 31/24 239/587.2 |
| 8,245,790 | B2 * | 8/2012 | Lozier | A62C 31/28 239/587.2 |
| 8,827,189 | B2 * | 9/2014 | Vanagosoom | A62C 99/00 169/24 |
| 8,944,346 | B2 * | 2/2015 | Uhler | A62C 31/02 169/52 |
| 2012/0126029 | A1 * | 5/2012 | Koetsier | B05B 3/0427 239/242 |

* cited by examiner

*Primary Examiner* — Steven J Ganey
(74) *Attorney, Agent, or Firm* — Michael D. Lazzara; Leech Tishman Fuscaldo & Lampl (57) ABSTRACT

An oscillation system suitable to convert a manual water monitor into an automated oscillating water monitor, without adversely changing the ergonomic orientations of the water monitor, comprising a flange configured to couple the water monitor to a standpipe and provide a source of motive water, and a conversion device to convert motive water to monitor oscillations.

13 Claims, 7 Drawing Sheets

METHODS AND APPARATUS FOR CONVERTING MANUAL TO OSCILLATING FLUID MONITORS

CROSS REFERENCE TO RELATED APPLICATIONS

This application claims benefit of and priority to U.S. Provisional Application No. 62/513,058, having a filing date of May 31, 2017, the entire contents, and disclosure of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to apparatuses and methods for converting a variety of manual fluid monitors to hydraulically-powered, oscillating fluid monitors; and more specifically relate to a standardized or universal conversion devices that can convert any of a variety of manual monitors, specifically those used in for fire extinguishing and related efforts, to automatically rotationally oscillating monitors.

Description of the Related Art

A fire is a rapid and continuing oxidation of combustible material. Usually the material is one that combines with the oxygen in air to reduce the constituent particles of the material to oxides and produces heat that is conveyed to other nearby particles to spread the fire. The material is generally regarded as the fuel for the fire. Proven methods of extinguishing a fire include the removal of oxygen, the removal of the fuel, and the reduction or elimination of the heat required to maintain continued combustion.

Water has been used throughout history to put out fires. Application of water typically reduces the temperature of the material below a point where combustion occurs. Additionally, in some cases, a projection of water onto a very hot fire may produce enough steam to sufficiently dissipate the oxygen present to a level below that supports combustion. In a similar manner, other fluids such as foams and other materials are known to extinguish fires.

Modern firefighting methods include water supplies, and means to distribute water over areas that are aflame, or may become engulfed in flames. For the latter case, dousing combustible material before flames reach it will help to stop the propagation of a fire. While the most preferred method is to have the water directly contact the fuel, this may not be practicable since the heat generated from a large fire may prevent firefighters and their equipment from getting close enough. To address this, streams or jets of water may be sprayed from a distance. The devices used for this include fire hoses, fire monitors, deluge guns, and deck guns.

A fire or water monitor is a fixed or mobile device for jetting a stream of water over a distance. One type of fire monitor is fixed and unattended. This type is often installed at a factory or plant where, in the event of a fire, it may spread water about its surroundings. Another type of fire monitor is fixed and attended, such as a deck gun where a firefighter manually aims the stream of water horizontally and/or vertically. These types of fire monitors are usually attached directly to a pipe or conduit capable of delivering water in high volume and high pressure. In most cases, the water supply conduit is substantially vertical and connected to the fire monitor via a bolted flange, union or other structural and fluidly sealed structure. Some fire monitors of this type have mechanisms to automatically direct the stream between predetermined positions such as from side to side, and have been called oscillating fire monitors.

One prevalent type of fire monitor has the capability to direct the stream of water horizontally and vertically. In this type of fire monitor, the lower portion is rotatable around the typically vertical axis of the supply pipe at a swivel above the union to the supply pipe. Similarly, an upper portion of the fire monitor may be rotatable in the vertical direction at an appropriately placed swivel. In many fire monitors, handles are positioned to allow a user, such as a fire fighter, to aim the stream of water vertically and/or horizontally.

Another type of fire monitor is mobile such that it may be carried or otherwise placed into position. From that vantage, it may be manually operated to direct a stream of water, or it may be locked into a specific position to jet a continuous stream in one direction without direct user attention.

The most prevalent type of fire monitors are those that are fixed in their position. When unattended, these will continue to jet water in one direction only. While this behavior allows firefighters to place them and then attend to other duties in putting out a fire, its fixed function is somewhat limiting in that firefighters may need to frequently address its effectiveness and may need to make adjustments.

Efforts have been made to provide oscillation to fire monitors in the past. One method has been to clamp a mechanism to the supply pipe, and tap into the side of the supply pipe for a stream of water to drive a water or Pelton wheel, which in turn drives an oscillation movement for the fire monitor. In some cases, the clamping the mechanism has to be designed in a situation by situation basis because the supply pipes are not all of a standardized shape or size. Also, taking a feed of pressurized water from tapping into the side of a supply pipe may cause problems from leakage or corrosion over time, and may compromise the supply pipe.

It will be appreciated that a manual fire monitor typically is designed for manual operation by a human, which means the height and position of the fire monitor nozzle and operating handle are typically optimized for convenient, ergonomic use. Prior attempts to convert manual fire monitors to oscillating fire monitors have disturbed, if not destroyed, this ergonomic height and position, making manual operation after conversion difficult and potentially harmful.

The inventions disclosed and taught herein are directed to hydraulically driven oscillating mechanisms that are easy to install on existing manual fire monitors, and can be effectively used for the conversion of a fixed or portable monitor to an automated, oscillating monitor, without significantly affecting the ergonomic attributes of the monitor.

BRIEF SUMMARY OF THE INVENTION

As one of many possible brief summaries of the nature and substance of the inventions claimed herein, I have invented an oscillator for a manual water monitor, comprising a flange having an outer surface defined by a predetermined thickness and a diameter, and configured to be inserted between a manual water monitor and a water supply conduit, the flange further configured with a water supply port in the outer surface; an oscillating assembly in fluid communication with water supply port and configured to connect to the water monitor, such that water flow from the flange into the oscillating assembly causes the water monitor to oscillate from a first position to a second position; and wherein the flange thickness is equal to or less than about 2 inches.

As another of many possible brief summaries of the nature and substance of the inventions claimed herein, I have invented a method of converting a manual water monitor to an oscillating water monitor, comprising: providing a water monitor capable of manual oscillation; unmounting the water monitor from its water supply conduit; providing a flange having an outer surface with a predetermined height of equal to or less than about 2 inches, and having a water supply outlet in the outer surface; mounting the flange between the water supply conduit and the water monitor; providing an oscillation motor comprising a water supply inlet, a water wheel, and a crank arm; securing the oscillation motor to the water supply conduit or the flange; establishing fluid communication between the water supply outlet and the water supply inlet; removably connecting the water monitor to the crank arm so that when water flows into the oscillation motor the water monitor oscillates from a first position to second position As another of many possible brief summaries of the nature and substance of the inventions claimed herein, I have invented An oscillation assembly for converting a manual water monitor to an oscillating water monitor, comprising: a flange having an outer surface with a height of less than about 3 inches, and having a water supply port in the outer surface; a motor comprising a gear box having a water wheel coupled to an input and a crank arm coupled to an output; a bracket configured to mount the motor to the water supply conduit or the flange; a body at least partially housing the water wheel and configured to direct motive water from the water supply port to the water wheel to drive the gear box; an oscillation arm configured to be coupled at one end to the crank arm and at another end to the water monitor, with at least one of the couplings being removable.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to disclose further certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

In broad terms, I have created methods and devices that enable or allow the modification or conversion of a manually operated water monitor into a water monitor capable of automated movement to jet water in more than one direction without substantive manual intervention. My inventions comprise an oscillation assembly that is added into or onto an existing water monitor. The oscillation system assembly comprises a system flange having a predetermined height or thickness, and which is configured to mate between the existing water monitor base flange and the existing standpipe or water conduit flange. The flange may have a water port or outlet, such a cylindrical hole, through the body of the flange to communicate water from the standpipe or water conduit to the outside of the flange. This outlet, as will be described in more detail below, provides energy in the form of motive water or fluid to power the oscillation assembly. The flange also comprises a mounting portion on its outer periphery configured to rigidly, yet adjustably, mount an oscillation assembly body. Alternately, the oscillation body may be mounted to the fluid supply conduit, such as by a clamping mechanism. The oscillation assembly body comprises a gearbox having an input and an output. An impulse-type fluid turbine, or water wheel, is coupled to the input shaft to convert fluid flow from the assembly flange into rotary motion. This rotary motion is transmitted through the gearbox the output shaft, which is coupled to crank arm. The crank arm is coupled to a portion or portions of the water monitor to transmit movement to the water monitor. For example, an oscillation arm may be coupled, such as by clamping, to the outer surface of a water monitor swivel joint. In this way, motion transmitted from the output shaft of the gearbox causes the water monitor, or a portion of the water monitor to move, such as oscillate from a first position to a second position. One of many benefits of this invention is that the overall height, position, and/or orientation of the water monitor is substantially unchanged after modification, at least with respect to an operator manually controlling the modified water monitor. Embodiments of my invention can easily convert fluid monitors having fluid passageways of up to about 4 inches in diameter, and larger, and having fluid flows of up to and in excess of 2,000 gallons per minute. Embodiments of my invention can operate at pressures as low as about 20 psi, with pressure losses typically less than about 5 psi.

The inventions disclosed herein may be configured to be mounted atop a vertically standing water pipe and between the water pipe and the fire monitor. The inventions disclosed herein also may be applied to embodiments where the water pipe is not vertical, or where the water monitor is not connected to a pipe. In another envisioned embodiment, a portable fire monitor may be oscillated by the inventions disclosed herein when it is attached to a fire hose. Other embodiments include, but are not limited to, using the inventions described herein in association with fire monitors on trucks, boats, as well as other mobile platforms, as well as in structures such as buildings, as well as in areas such as parking lots and fields. It must be understood that the inventions described and taught herein are not limited to use with a fire monitor, but may be utilized wherever an oscillating effluent stream is desired from a source of a fluid. Along that line, the inventions disclosed and taught herein are not limited to fighting fires or the suppression of fires, but may be applied in many other areas such as, but not limited to, mining, drilling, farming, irrigation, cleaning, dust and particulate suppression, spray finishing of objects, and many other areas where a stream, jet, mist, sprinkle, or rain of a fluid may be used.

Figure 1:
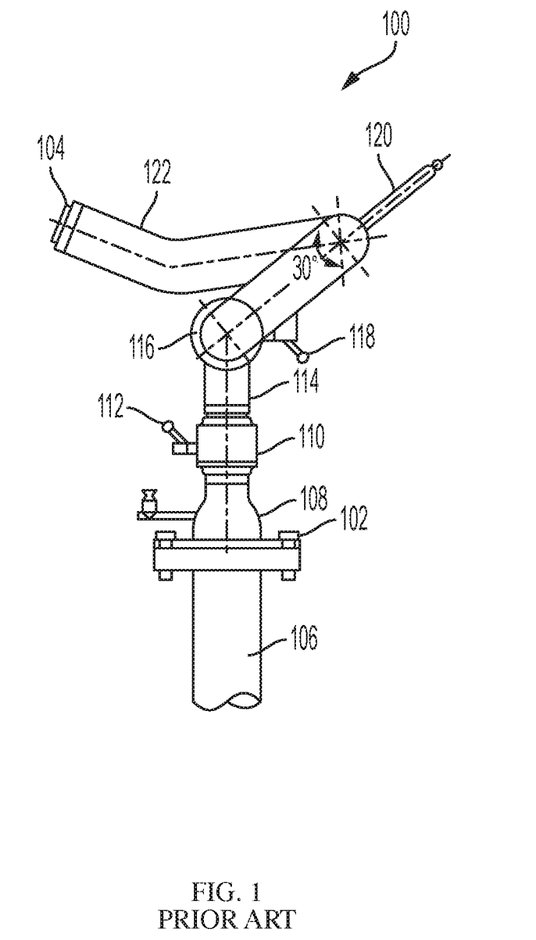
FIG. 1 illustrates the components of a typical conventional manual fire monitor.

Turning now to the figures, FIG. 1 illustrates a conventional fire or water monitor 100. The monitor 100 is usually considered to comprise the components from the base flange 102 to the nozzle 104. While the water supply conduit 106 may not be considered part of the monitor 100, it is integral to its operation as it supplies the water or fluid to be distributed by the nozzle 104, and in certain situations, provides the structural support for the monitor 100. A conventional monitor 100 comprises a base flange 102 and a conduit, such as a reducer 108. A drain valve 124 may be provided as desired. Typically, the water supply conduit 106 and the reducer 108 are oriented in substantially vertical orientation, and a first swivel joint 110 permits rotation about the vertical axis (i.e., horizontal movement). A lock 112 is typically provided to lock the first swivel in a particular, horizontal, position. A ninety-degree elbow 144 may be coupled to the first swivel joint 110, thereby changing the orientation of the structure from substantially vertical to substantially horizontal. A second swivel 116 is provided and permits rotation about a horizontal axis, which provides vertical adjustment of the nozzle 104. A lock 118 is typically provided to lock the second swivel in a particular, vertical, position. Often times a handle 120 is provided to allow an operator to manually adjust the horizontal and/or vertical orientation of the nozzle 104. With a manual water monitor 100, the only way to provide vertical or horizontal oscillation of the fluid stream exiting the nozzle 104 is for an operator to manually move the monitor 100 in the desired directions.

Figure 2:
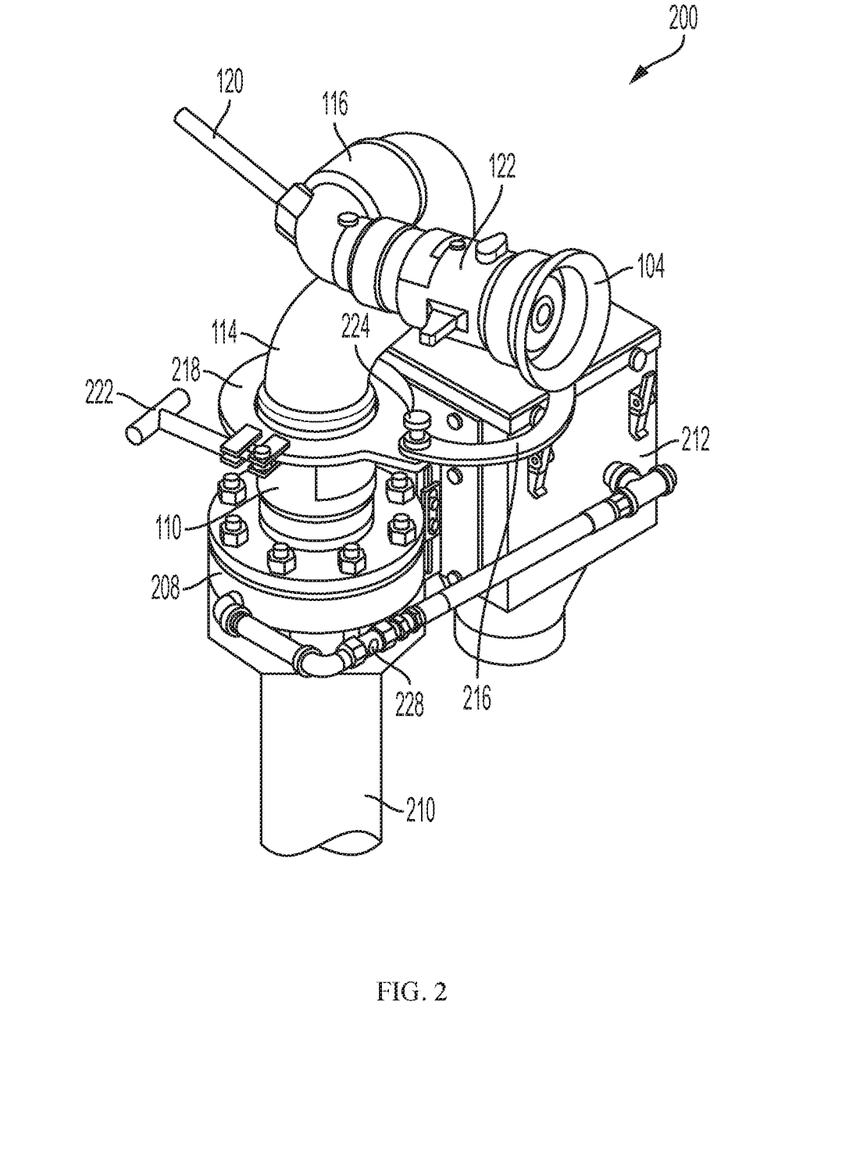
FIG. 2 illustrates one of many possible embodiments of the present invention applied to a conventional fire monitor.

FIG. 2 is a perspective view of one of many possible embodiments of an automated oscillation assembly 200 according to the inventions disclosed herein with an exemplary fire monitor 122. The exemplary fire monitor 122 is configured to spray a fluid, such as water, when the valve or nozzle 104 on top of the fire monitor is in an open position. As is shown in FIG. 2, the lower flange 102 of the fire monitor 122 is connected to the flange 208 of the oscillator assembly 200. A majority of the pressurized water in fluid supply conduit 210 flows through the interior of the oscillator flange 208 to be propelled out the nozzle 104 of the fire monitor 122. Another typically smaller portion of the pressurized fluid may be directed through a fluid outlet in the oscillation assembly flange 208 for use in creating automated movement of the monitor 122.

Mounted to the oscillation assembly flange 208 is an oscillation assembly housing or body 212. The housing or body 212 contains a device for converting the fluid diverted from the flange 208 (through plumbing 214) into rotary or linear motion. As illustrated in other Figures, it is preferred that the conversion device comprises a fluid turbine or wheel that is driven by the fluid flow, and which drives a gearbox, preferably a reduction gearbox. The gearbox output is then used to provide motion, such as oscillatory motion, to the monitor 122.

In the embodiment illustrated in FIG. 2, an oscillation arm 216 is shown coupling an attachment mechanism, such as clamp 218, (applied on a horizontal swivel joint 110) with the output of the gearbox (not shown in FIG. 2). The clamp 218 may have an adjustable locking mechanism 222, which allows the clamp 218 to couple to a variety of sizes and shapes of monitor swivels. The oscillation arm 216 may be coupled to the clamp 218 with a quick release mechanism 224, such a spring-load pin and box mechanism. In this way, if an operator wants to quickly cease automated control of the monitor 122 and apply manual control through handle 120, the quick release mechanism 224 provides such functionality. And, when automated control is desired, the oscillation arm 216 may be re-coupled to clamp 218 through application of the quick release mechanism 224.

It is preferred, but not required, that the oscillation assembly 200 comprise a control valve 228 in the fluid path between the oscillation assembly flange 208 and the motion-creating device. The control valve 228 may take any of several forms, including without limitation, a manually operated valve, or an automatic or controllable valve. Manual control valves may include simple stem valves, ball valves, or metering valves. Automatic or controllable valves may include solenoid or motor driven valves or flow restriction devices, and such may controlled via wired or wireless communication strategies. It will be appreciated that the speed of movement of the monitor 202, as well as movement at all, can be controlled by controlling the volume, pressure, and/or flow rate of the fluid entering the oscillator housing 216.

Figure 3:
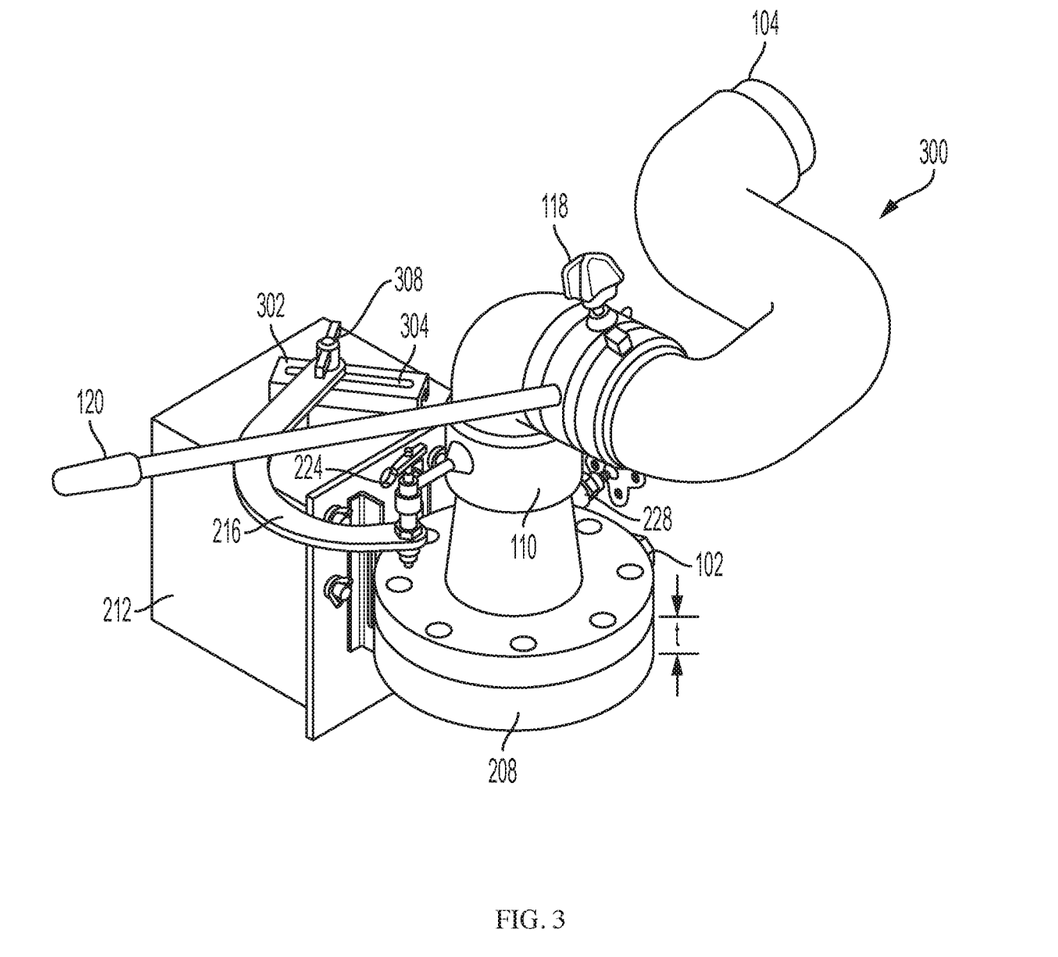
FIG. 3 illustrates another one of many possible embodiments of the present invention applied to a conventional fire monitor.

FIG. 3 illustrates another embodiment of an oscillation assembly. It will be appreciated that many of the components illustrated for oscillation assembly 300 are similar, and oftentimes identical, to the corresponding components in the oscillation assembly 200 illustrated in FIG. 2. Those of skill in the art having benefit of this disclosure will be able to mix and match the various components to make other and further embodiments without departing from the inventive concepts disclosed herein. As shown in FIG. 3, the oscillation assembly 300 comprises a crank arm 302 coupled to the output shaft of the gearbox (not shown in FIG. 3). As the output shaft rotates, the crank arm 302 rotates with it. The crank arm 302 preferably has a predetermined length, and slot 304 spanning a portion of the length. Although the arm 302 and slot 304 are shown in FIG. 3 to be linear, either or both may be curved. One end of the oscillation arm 216 may be rotatably coupled to the crank arm 302 with an adjustment mechanism 308, such as by a bolt and screw. It will be appreciated that movement path of oscillation arm 216 can be adjusted or modified by changing or adjusting point along slot 304 to which the arm 216 is coupled. As may be seen, the oscillating arm may be curved in such a manner so as to not engage the fire monitor during its oscillation cycle.

The other end of arm 216 is coupled to horizontal swivel 110 through attachment mechanism 306. Attachment mechanism 306 may be welded, screwed, or otherwise attached to the swivel joint 110. For example, the attachment mechanism 306 may be a threaded fastener that coupled to the threaded receptacle for the existing swivel lock. The attachment mechanism 306 is coupled to the arm 216 preferably through a quick release mechanism 224, such as described above. It is presently preferred that attachment mechanism 218, 306, not permanently attach to or modify the monitor 122. It is preferred that the attachment mechanism be readily removable from the monitor 122, such as by unclamping clamp 218.

Also shown in FIG. 3 is the predetermined height or thickness "t" of the oscillator flange 208. As discussed above, one of the many benefits of my invention is that the conversion of a monitor from manual to automated does not appreciably change the ergonomic design of the manual monitor. To this end, it has been found desirable to make the thickness "t" of the flange 208 as small as possible to minimize the change in ergonomic parameters. A person of skill having benefit of this disclosure will be able to determine a flange thickness "t" best suited for the current application of these inventions. For example, and not limitation, if a 0.5 inch diameter fluid outlet is desired for flange 208, then it has been found that a 1.75 inch thick flange is desirable to provide adequate flange sealing capabilities, and structural support capabilities. Additionally, or alternately, depending on the weight of the oscillator housing 216 that may be hung off the flange 208, the thickness may be varied accordingly. It has been found that for most monitor applications, a flange 208 thickness of between about 1 inch and about 4.5 inches is desired. A change in the ergonomic height of handle 120 from about 1 to about 4.5 inches should not adversely affect an operator's ability to manually control the monitor 122, if such control becomes necessary.

Figure 4:
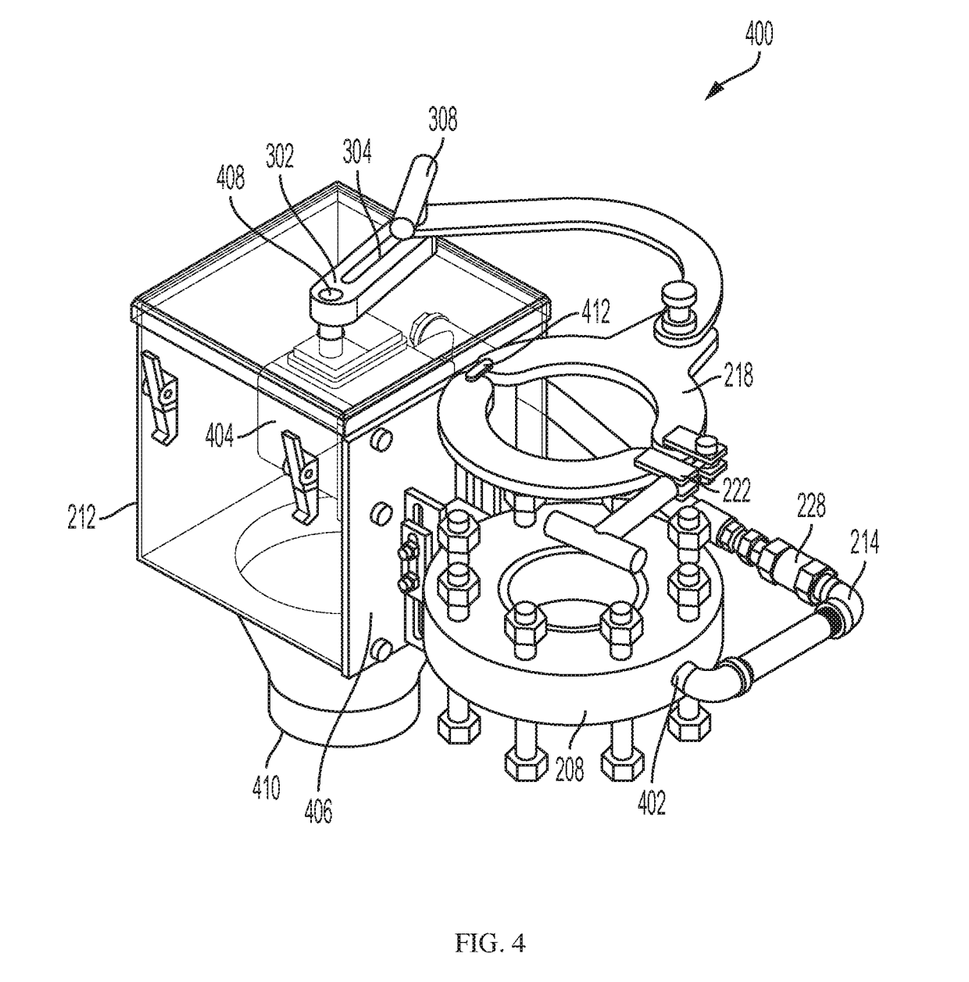
FIG. 4 illustrates an oscillation conversion system according to the present inventions.

FIG. 4 illustrates the embodiment of FIG. 2 from a different perspective and with a semi-transparent housing 212. A monitor is not shown in this Figure. FIG. 3 shows more clearly motive water plumbing 214 coupled to the motive water outlet 402 in flange 208. Also gearbox 404 is shown inside housing 212 and coupled to bracket 406, which in turn is adjustably coupled to flange 208. Crank arm 304 is shown coupled to gearbox output shaft 408. The housing 212 is shown with downward facing outlet 410. It will be appreciated that after motive water from flange outlet 402 impacts the turbine or water wheel (not shown) the water or fluid may be disposed of. In firefighting situations, simply allowing the water to flow out the bottom of the housing 212 may be acceptable. In other situations, piping, such as flexible conduit, may be attached to the housing outlet 410 and the used fluid transported to a desired disposal area. Depending on the construction of the gearbox and other component's, the housing 212 may be eliminated entirely, and the motive fluid allowed to land where it will. Alternately, a housing may be provided to shroud only the turbine or water wheel. Still further, the housing 212 may configured to retain a certain volume of water that does not interfere with operation of the turbine, but provides cooling for the oscillation assembly components (such as when fighting fires). Still further, used motive water can be siphoned from the housing such as by using an eductor or other type of entrainment device at the end of the monitor. In this embodiment, used motive water is available for fighting fires, rather than being discarded.

It will be noted that the swivel clamp 218 illustrated in FIG. 4 is a two-piece clamp with a linking element 412. Because monitors come in various sizes and because swivels tend not to have a consistent outer diameter, providing a multi-element clamp 218 that can function with a range of swivel sizes is desirable.

Figure 5:
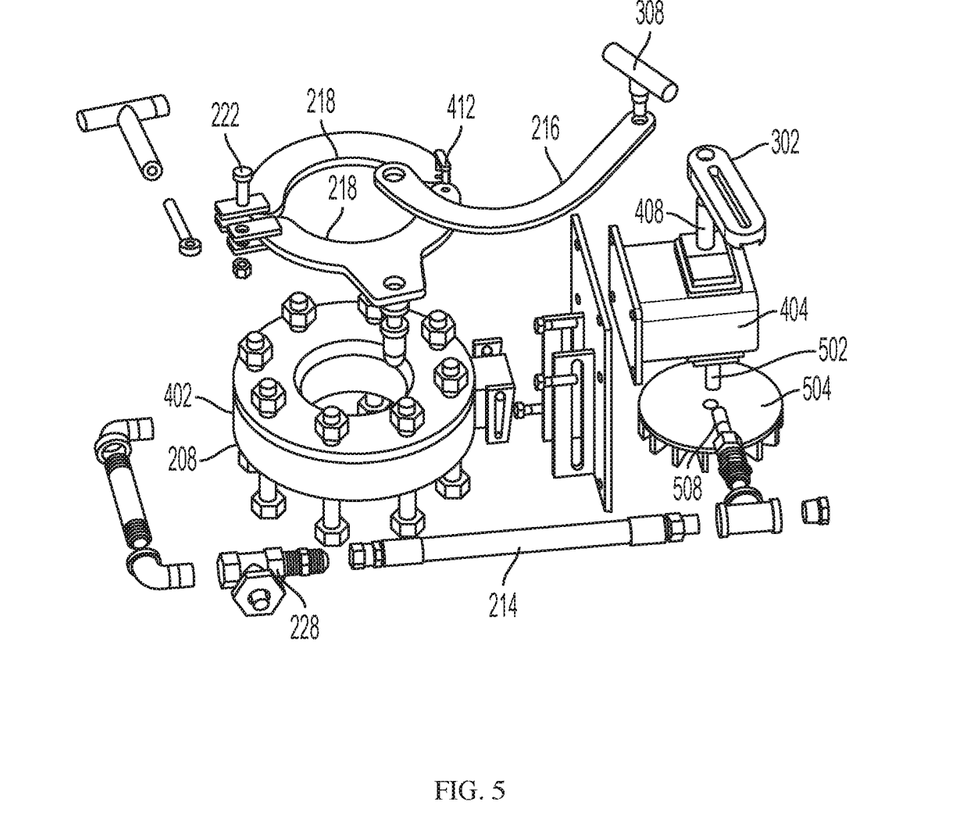
FIG. 5 illustrates an exploded view of the oscillation conversion system of FIG. 4.

FIG. 5 is an exploded view of the oscillation assembly of FIGS. 2 and 4. Shown in detail is gearbox 404 having an input shaft 502 and output shaft 408. For the embodiment illustrated in FIGS. 2 and 4, it has been found that a reduction gearbox, such as the TW113A worm gear speed reducer offered by Boston Gear with an input RPM of around 1750 and a reduction ratio of around 300:1 is suitable. Coupled to the input shaft 502, is, preferably, an impulse type water turbine or water wheel 504 configured to convert flowing fluid from the flange 208 into rotary motion. It is preferred that an unducted, brass or bronze water wheel 504 with a single face 506 be used the present inventions. However, various designs of water wheels are suited for this purpose, including ducted, unducted, and closed face. Associated with the particular type of water wheel 504 used, a nozzle 508 may be used to optimize the transfer of energy from the fluid to the wheel 504.

Figure 6:
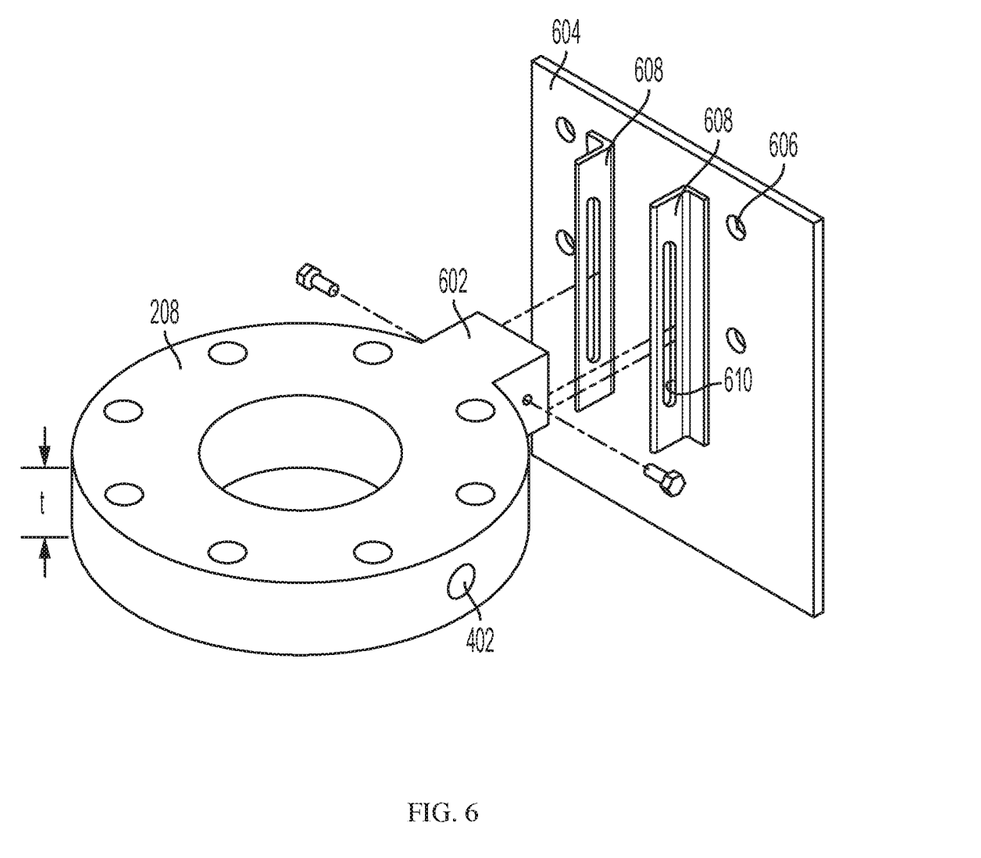
FIG. 6 illustrates one of many possible embodiments of an oscillation system flange and bracket.

FIG. 6 illustrates a preferred oscillation assembly flange 208. In the preferred embodiments, the flange 208 also comprises a bracket mount 602, which may be integrally formed in the flange 208, or attached or coupled to the flange 208, such as by welding. Associated with the flange 208 is a bracket or plate 604, the primary purpose of which is to mount the gearbox 304 and thereby react the forces imposed on the gearbox 304. For the preferred gearbox mentioned above, four mounting holes 606 are shown. To adapt the oscillation assembly of the present inventions to the various water monitors in use, the bracket 604 may also comprise one or more adjustment rails 608 secured to the bracket and having an adjustment slot 610 herein. It will be appreciated that the location, e.g., height, of the bracket, and therefore location of the oscillation arm 216 can be varied changing where in the slot 610 the flange bracket mount 602 is coupled. Of course, those of skill will appreciate that there are various ways of accomplishing this adjustability, such as by securing the rails 608 to the bracket mount 602 rather than the bracket 604. Or, eliminating the rails 608 entirely and providing an adjustment slot 610 in the bracket. As with all of the disclosures herein, this disclosure is not to be considered limiting, but rather illuminating.

Figure 7A:
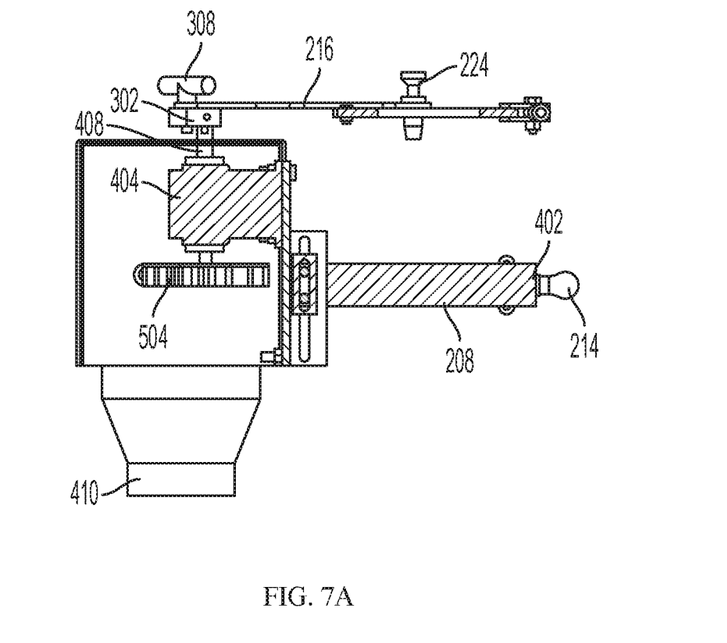
FIGS. 7A and 7B illustrates side views of one of many possible oscillation system assemblies according to the inventions disclosed herein.
Figure 7B:
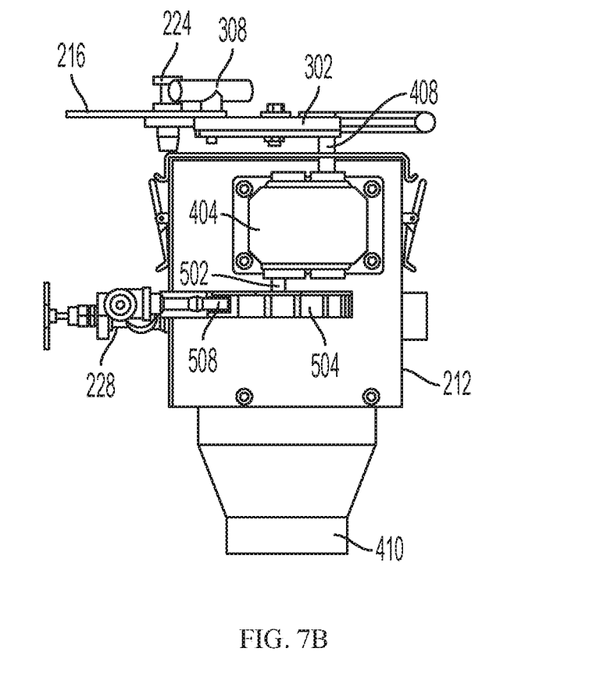

FIGS. 7A and 7B illustrate different views of the oscillating assemblies described above, showing more detail of configuration and structural relationships between and among components.

Having the benefit of this disclosure, it now will be appreciated that the dimensions of the oscillator flange may be sized to fit with any style of fire monitor or other apparatus useful in ejecting a fluid. In the embodiments described above, the oscillator flange has sufficient bolt holes to attach to a fire monitor and pipe having similar flanges. The oscillator flange may have a flow aperture dimensioned to match the interior diameter of the supply pipe. Water, or another fluid, may flow through this aperture from the supply pipe to the fire monitor. In other envisioned embodiments, it may be preferable to have the aperture be of larger or smaller dimensions than the supply pipe, or the fire monitor. The oscillation flanges depicted above show the aperture having vertical sides. While this may be a preferred embodiment, other geometries may be utilized without departing from the inventions disclosed and taught herein. In one envisioned embodiment, the walls of the flow hole may be concave, convex, or inwardly or outwardly sloping providing pressure and flow velocities predictable through the concepts attributable to Bernoulli and Venturi in their works on fluid dynamics.

While the embodiments discussed above envision the water outlet port in the oscillation flange terminating flush with the inside wall (aperture) of the flange, other embodiments may be preferred. In one envisioned embodiment, the outlet port may have a Pitot tube arrangement inside the flange to obtain a fluid stream either from the upstream side, the downstream side, or from other areas. Other geometries may be utilized to provide flow characteristics predictable through fluid dynamics. In another envisioned embodiment, desirable flow characteristics may be obtained by having the water outlet offset from the axis of flow through the aperture.

While the embodiments discussed above disclose the oscillation movement of the fire monitor to be horizontal (i.e., rotation about a vertical axis), the inventions disclosed herein are not limited to only that. In another envisioned embodiments, the crank arm and oscillation arm may be oriented such that the provide vertical oscillation to the fire monitor. For example, but not limitation, a second water outlet from the oscillation flange may be connected to a second oscillation assembly. The first assembly may then provide horizontal oscillation while the second assembly provides vertical oscillation. By using the adjustment mechanism on the crank arms, the periodicities of oscillation can be sufficiently different to proportionally distribute the water.

In yet another envisioned embodiment, the gearbox may have two output shafts orthogonal to one another. One shaft would provide horizontal oscillation while the other provides vertical oscillation.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the inventions disclosed herein, but rather, in conformity with the patent laws, I intend to fully protect all such modifications and improvements that come within the scope or range of equivalent of the following claims.

What is claimed is:

1. A method of converting a manually operated monitor to automated monitor, comprising:
   providing a fluid monitor configured for manual operation, the fluid monitor having an oscillating arm;
   detaching the monitor from its fluid supply conduit;
   mounting between the supply conduit and the monitor a flange having a fluid supply outlet;
   maintaining manual operability of the monitor by controlling a predetermined height of the flange to be equal to or less than about 4 inches;
   securing to the supply conduit or to the flange an oscillation assembly comprising a fluid supply inlet, a water wheel, and a crank arm structured for removable connection to the oscillating arm of the fluid monitor;
   establishing fluid communication between the fluid supply outlet and the fluid supply inlet; and
   removably connecting the crank arm to the oscillating arm of the monitor so that when fluid from the inlet impinges the water wheel, the oscillating arm causes the monitor to oscillate from a first position to second position.

2. The method of claim 1, further comprising adjusting the oscillation of the water wheel, changing an amount of fluid that impinges the water wheel.

3. The method of claim 1, further comprising using a gearbox to reduce a speed of rotation of the crank arm relative to a speed of rotation of the water wheel.

4. The method of claim 1, comprising adjusting the oscillation distance between the first and second position.

5. An oscillation assembly for converting a manual fluid monitor to an oscillating monitor, comprising:
- a flange having an outer surface with a height of less than about 4 inches, and having a fluid supply port in the outer surface;
- a motor comprising a gear box having a water wheel coupled to an input shaft and a crank arm coupled to an output shaft;
- a bracket configured to adjustably mount the motor to the water supply conduit or the flange;
- a body at least partially housing the water wheel and configured to direct fluid from the water supply port to the water wheel to drive the gear box; and
- an oscillation arm coupled at one end to the crank arm and at another end to the water monitor, with at least one of the couplings providing a quick release.

6. The oscillation assembly of claim 5, further comprising a bracket mount associated with the outer surface of the flange, and configured to receive the bracket.

7. The oscillation assembly of claim 6, wherein the gearbox is configured to the reduce the speed of the output shaft relative to the speed of the input shaft.

8. The oscillation assembly of claim 7, further comprising a clamp configured to securely engage a swivel joint on the monitor, and to releasably couple to the oscillation arm.

9. The oscillation assembly of claim 8, further comprising a control valve disposed between the fluid supply port and the motor, and configured to adjust an amount of fluid impinging the water wheel.

10. The oscillation assembly of claim 9, wherein the control valve is selected from the group consisting of: a manually operated control valve; a wirelessly operated control valve; and a wired control valve.

11. The oscillation assembly of claim 9, wherein oscillation of the monitor is on a substantially vertical axis.

12. The oscillation assembly of claim 8, wherein an oscillation distance of monitor is adjustable.

13. An oscillation assembly for a manually operable fluid monitor, comprising:
- a flange having an outer surface with a height of less than about 4 inches, having a fluid supply port in the outer surface, and having a bracket mount associated with the outer surface;
- a bracket configured to securely mount a gearbox, and configured to adjustably mount to the bracket mount;
- a gearbox securely coupled to bracket and configured to reduce the speed of rotation between an input shaft and an output shaft;
- a water wheel coupled to the input shaft associated with the gearbox;
- a crank arm coupled to the output shaft associated with the gearbox;
- a housing at least partially enclosing the water wheel;
- a conduit configured to direct fluid from the flange supply port to the water wheel to drive the gearbox;
- a fluid control valve in communication with the conduit, and configured to control an amount of fluid that impinges the water wheel;
- a clamp securely and removably connected to a swivel joint associated with the monitor;
- an oscillation arm coupled at one end to the crank arm and at another end to the clamp via a quick release connection; and
- wherein the coupling between the crank arm and the oscillation arm is adjustable so that a period of oscillation can be adjusted.

* * * * *